May 27, 1924.
M. P. SENÈZE
VEHICLE DRIVEN BY AIR PROPELLER
Filed April 5, 1921
1,495,812
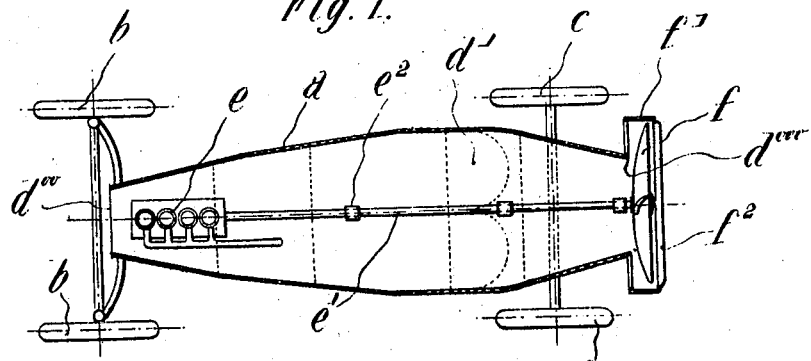
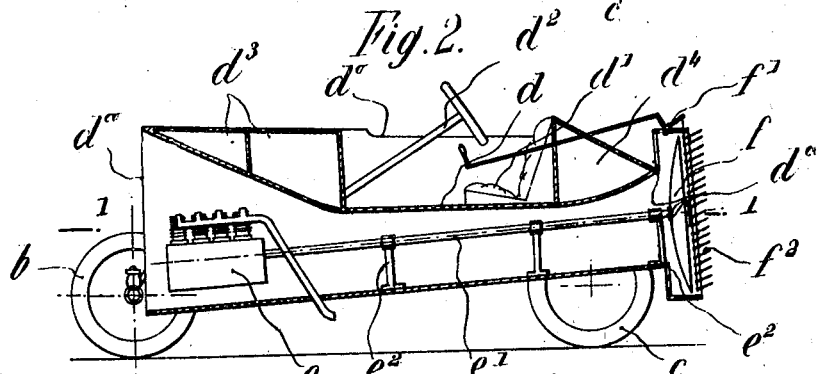
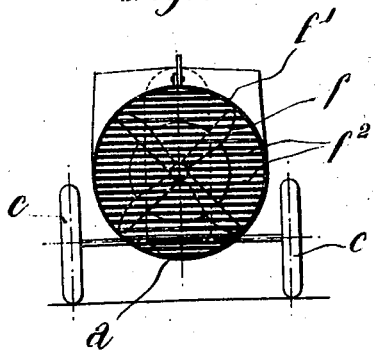
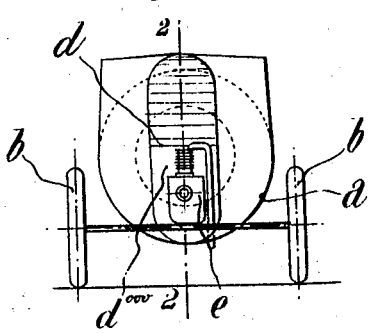
Inventor
Marcel Pierre Senèze
By
Attorney Patented May 27, 1924.

1,495,812

UNITED STATES PATENT OFFICE.

MARCEL PIERRE SENÈZE, OF ESSONNES, FRANCE.

VEHICLE DRIVEN BY AIR PROPELLER.

Application filed April 5, 1921. Serial No. 458,734.

*To all whom it may concern:*

Be it known that I, MARCEL PIERRE SENÈZE, engineer, citizen of the French Republic, and resident of Essonnes, Department of Seine et Oise, France, have invented certain new and useful Improvements in Vehicles Driven by Air Propellers, of which the following is a specification.

The invention relates to vehicles driven by air propellers and more particularly, but not exclusively, to power driven vehicles which are fitted with such a system of propulsion.

The object of the invention is to adapt such vehicles in such a manner that their mode of operation is better and simpler than heretofore.

The invention consists more particularly in this that the vehicles in question comprise a tubular body, within which the driving engine is fixed and which opens at one end directly to the outside, while the opening at the other end is opposite an air propeller system, so that, when this air propeller is put in operation the outside air sucked in by it plays about the engine.

In addition to this main feature the invention comprises several other arrangements, which are preferably used with it and are described below:—

The invention is made perfectly clear in the following description and in the drawings, both of which, however, deal with one only of the many possible constructional forms of the invention.

In the accompanying drawing,

Fig. 1 is a section on line 1—1 of Fig. 2,

Fig. 2 is a section on line 2—2 of Fig. 4, some parts being omitted,

Fig. 3 is a back view of the vehicle and

Fig. 4 is a front view of the same.

According to the invention a power driven vehicle is provided which is moved by an air propeller driven by an explosion motor, the construction of which is as follows:

$a$ designates a tubular body, which is mounted on a metal frame or skeleton made of tubes or the like, and which form the chassis or framework proper of the vehicle, is made in such a manner that it can be used both as the chassis and as the body of the vehicle. This body $a$ is for this purpose provided in the neighbourhood of both ends with inclined portions adapted to support the two sets of wheels of the vehicle, preferably with the interposition of springs. The front wheels $b$ are for instance formed as steering wheels and are moved for this purpose in the usual manner, while the back wheels $c$ serve only for carrying the vehicle and are preferably mounted loosely on their journals. The tubular body is further provided with a hollow space or a recessed part $d$ of suitable dimensions, in which, in the places intended for the driver and the other occupants, seats $d^1$ and the steering pillar $d^2$ are fitted. This hollow space is formed in one part with the upper part of the tubular body $a$. There is an opening $d^0$ in the upper part of the body $a$ for enabling the parts mentioned to be fitted.

The tubular body $a$ is so dimensioned that in its front part it can contain the engine $e$, which is fixed by suitable means within the body $a$. The recessed part $d$ is so dimensioned and is so shaped that air entering at the front end will impinge on the engine, flow along in the tubular body and, after having passed through the tubular passage $a^1$ below the recessed part, leaves at the rear end. The engine $e$ is preferably arranged in such a manner that its driving shaft $e^1$, which runs in bearings supported in the body $a$ lies in the vertical axial plane of the body $a$. The length of the shaft is such that, after passing through the intermediate spaces between the recessed part $d$ and the bottom of the tubular body $a$, it terminates at the rear end of the latter.

The position of the shaft $e^1$ in this plane is the most suitable one for driving the propeller $f$, which serves for moving the whole vehicle and is mounted on the free end of the shaft.

Additionally, the following arrangements are provided:—

The tubular body $a$ terminates in front in a part $d^{00}$ substantially eliptical in cross section which is narrower at the part surrounding the engine. The rear and in front of the body $a$ has a narrow part $d^{000}$ in the neighbourhood and in front of the propeller $f$, which lies concentrically with the axis of the shaft $e^1$ and is circular in cross section, the diameter of which is substantially equal to the diameter of the middle portion of those parts which are not used for the propulsion of the vehicle. It will also be noted by an examination of Fig. 4 that the front part $d^{00}$ of the tubular body is greater in cross sectional area than the rear part $d^{000}$. This diameter is for instance such that the cross-section of the rear constricted part amounts to about one third of the whole surface covered by the propeller.

A recessed part $d$ is preferably so shaped that its front wall, which is preferably inclined so as to adapt itself easily to the tubular shape of the body, is for instance continued as far as the rear end of the tubular body. In this case the rear wall is preferably formed in such a manner that it combines again with the circular rear end of the tubular body, forming with the wall of the same a substantially conical conducting body. If required, the two end portions $d^3$ and $d^4$ of the recessed part may be used, for instance for holding the fuel container, luggage, tools and the like.

Outside the air propeller $f$ an annular protective casing $f^1$ is preferably mounted, which is fixed to the propeller body. At the rear of this casing a number of wings or flaps $f^2$ may be fitted, the inclination of which may be adjusted at will about a horizontal axis, for reducing, when necessary, the cross-section of the passage for the air, which is forced backward by the propeller, or for enabling in any case the direction of the emerging air to be varied, so that everything lying behind the vehicle can be at any time saved from the action of the emerging air. In this manner it is possible to prevent air eddies being formed in the road. In addition to this arrangement the shaft $e^1$ of the air propeller is preferably slightly inclined upwardly from the front to the back.

It will be seen that, when the regulating flaps are completely closed, the air will be forced in the forward direction and may thus act as a brake for the vehicle. In this way it is also possible to cause the vehicle to run backwards by closing the regulating flaps.

Thus, with the various arrangements described, a power driven vehicle of a simple construction is obtained, which moves forward by means of its propeller, by the propeller sucking the air between the walls of the conical portion of the tubular body $a$ and the walls of the protective casing $f^1$ and also through the front end of the tubular body. This latter air thoroughly cools the engine, both on its sides and on its upper surfaces. The air is thereupon conveyed along the inside of the tubular body towards the propeller and is forced out at the back. The shape of the vehicle is such that it offers the least possible resistance to the forward movement of the vehicle.

Naturally, and as was stated above, the invention is not restricted in any way to the constructional forms described above, but comprises any modifications of the same.

Having now particularly described and ascertained the nature of my said invention and in what manner the same is to be performed, I declare that what I claim is:—

1. A vehicle having a tubular passageway extending from the forward to the rear end of the body thereof and open at both ends, an engine located within the passageway and a propeller at the rear end of the passageway, said propeller being so constructed and arranged that when in operation a current of air will be sucked rearwardly through said passageway in the propulsion of the vehicle, said passageway being of greater area at the intake end than at the outlet end.

2. A vehicle having a tubular passageway extending lengthwise of the body from the front to the rear thereof and open at both ends, an engine within and toward the forward end and a propeller adjacent the rear end of the passageway, said propeller having a shaft extending therefrom into said passageway, said shaft being inclined downwardly from the propeller to the engine with which it is in driven connection.

3. A vehicle having a tubular passageway extending lengthwise through the body from front to rear thereof and open at both ends, an engine in the passageway and a propeller at the rear of said passageway, a housing for said propeller, horizontally pivoted shutters in the rear of the propeller adapted to be adjusted to a position upwardly inclined from said propeller, and means for adjusting said shutters.

4. A vehicle having a tubular passageway extending from front to rear and open at both ends, an engine within and toward the forward end of said passageway, a propeller at the rear of said passageway surrounded by a housing, a shaft constituting an axle for the propeller inclined forwardly and downwardly from the propeller to the engine with the latter of which it is in driving connection, horizontally pivoted shutters in said housing rearwardly of the propeller, and means for adjusting said shutters to a position of inclination upwardly from the propeller.

5. A road vehicle having a tubular passageway extending from the forward to the rear end of the body thereof and open at both ends, an engine located within said passageway, a propeller of larger radius than said passageway located at the rear end thereof, a casing surrounding said propeller open both forwardly and rearwardly and of such diameter and in such relation to the passageway that only part of the air sucked into the propeller passes through the passageway.

In testimony whereof I have signed my name to this specification.

MARCEL PIERRE SENÈZE.